United States Patent [19]
Blades

[11] Patent Number: 5,536,411
[45] Date of Patent: Jul. 16, 1996

[54] WATER AND ENERGY RECOVERY PROCESS FOR AN ICE RINK

[75] Inventor: Russell W. Blades, Carlisle, Canada

[73] Assignee: Bassai Limited, Burlington, Canada

[21] Appl. No.: 337,553

[22] Filed: Nov. 10, 1994

[51] Int. Cl.[6] .................................................. B01D 15/04
[52] U.S. Cl. ...................... 210/638; 210/639; 210/652; 210/663; 210/664; 210/685; 210/687; 210/694; 210/750; 210/765; 210/766; 210/774; 210/900; 37/197; 37/219; 299/25; 62/235
[58] Field of Search .............................. 62/235; 210/900, 210/650, 652, 654, 661, 663, 681, 690, 694, 765, 766, 774, 749, 638, 639, 664, 685, 686, 687, 750; 37/197, 219; 299/25

[56] References Cited

U.S. PATENT DOCUMENTS

| | | | |
|---|---|---|---|
| 3,276,458 | 10/1966 | Iversen et al. | 210/900 |
| 4,160,727 | 7/1979 | Harris, Jr. | 210/900 |
| 4,301,788 | 11/1981 | Hummel | 62/235 |
| 4,622,133 | 11/1986 | Furuno | 210/900 |
| 4,953,360 | 9/1990 | Rzechula | 62/235 |

OTHER PUBLICATIONS

1990 Ashrae Handbook; Refrigeration Systems and Applications, Chapter 34—Ice Rinks.
Ashrae Journal, Apr. 1992, *Modernizing and Retrofitting Ice Skating Rinks*, by Russell W. Blades, pp. 34–42.
*Energy Conservation in Ice Skating Rinks*, U.S. DOE, 1980, by B. K. Dietrich and T. J. McAvoy, DOE/TIC–10289.

*Primary Examiner*—Robert J. Popovics
*Attorney, Agent, or Firm*—Galgano & Burke

[57] ABSTRACT

A water and energy recovery process for an ice rink is disclosed. The process includes softening and carbon filtering water for use as flood water on an ice rink. The water is then demineralized by reverse osmosis to produce flood water having a specific conductance of about 2 to 30 micromhos/cm. The demineralized water is heated to 90° F. and utilized in a resurfacer to flood the surface of the ice rink. The ice shavings removed from the surface of the ice by the resurface are deposited into a holding means and melted by utilizing recovered heat from the ice rink's refrigeration unit. The melted water from the holding means is used as a coolant in the ice rink's refrigeration unit. The steps of the process are then repeated, utilizing the warmed water from the refrigeration unit.

14 Claims, 5 Drawing Sheets

5,536,411

WATER AND ENERGY RECOVERY PROCESS FOR AN ICE RINK

FIELD OF THE INVENTION

This invention relates to a water and energy recovery process for an ice rink and in particular, a process utilizing demineralized water.

BACKGROUND OF THE INVENTION

Municipal, well or lake water is commonly used to make the initial ice sheet of an ice rink and for maintenance of the ice. Such water contains mineral salts, dissolved solids and other impurities. The higher the concentration of these impurities, the higher the "specific conductance" (ie. micromhos/cm) of the water. Using water having a high level of impurities, and accordingly, a high specific conductance (ie. 200–800 micromhos/cm), results in poor ice quality and increased energy and operating costs for the following reasons.

As the ice rink water freezes, the water port ion freezes first pushing dissolved solids into the remaining liquid portion where salts and other impurities concentrate. This final portion eventually freezes, but at the surface of the ice sheet, where at the presence of a high concentration of impurities causes the ice surface to be soft, shaley, and opaque in appearance.

Based on a municipal water supply having a specific conductance of 350 micromhos/cm, a typical core sample of an ice sheet would reveal the bottom portion (ie. concrete or sand interface) as being relatively pure (ie. 180 micromhos/cm), while the surface of the ice could have a specific conductance as high as 700 micromhos/cm. Additionally, the specific conductance of the ice surface will increase over time, through the inherent processes of evaporation and sublimation, further deteriorating the quality of the ice surface.

During the maintenance of the ice, an ice resurfacer (ie. Samboni', Olympia', etc.) is used to shave the ice to remove slush, snow, and dirt from the surface of the ice. The resurfacer then floods the surface of the ice with fresh water thereby applying a fresh surface layer of ice. The shavings picked up by the resurfacer from the ice's surface are stored in a snow tank within the resurfacer. After the resurfacing operation, the shavings in the snow tank are dumped into an ice pit to melt and the resulting water is disposed of by drainage into the municipality's sewage system.

The amount of energy and water used for ice making and maintenance is substantial. For example, a rink must heat about 120 gallons of water to 150 degrees Fahrenheit every time the ice of the rink is flooded. Not only does this require energy to heat the water (about 90,000 Btu/flood), but the warm water creates a refrigeration load of about 260,000 Btu/flood (ASHRAE, Journal, April 1992, "Modernizing and Retrofitting Ice Skating Rinks", Russell Blades).

In terms of water consumption, ice making and maintenance will require about 800,000 gallons of water per year for an average sized rink. Additionally, to help speed up the melting of the ice in the ice pit, many ice rink operators apply hot water to the pit from a hose. This practice not only wastes water, but energy as well.

For ice rinks that use cooling towers or evaporative condensers and compressors, annual water usage for this equipment is typically an additional 2,500,000 gallons.

There is, therefore, a need for an improved ice rink maintenance process which reduces water and energy consumption while improving the quality of the ice surface.

SUMMARY OF THE INVENTION

This invention provides an ice making and maintenance process for an ice rink which reduces water and energy consumption and consequently, operating costs, while at the same time improving the quality of the ice.

In accordance with one aspect of the invention there is provided an ice making and water recovery process for an ice rink, comprising the steps of: demineralizing water to produce flood water substantially free of mineral salts, dissolved solids and other impurities; heating said demineralized water for use as flood water for the said ice rink; resurfacing the surface of the ice rink by (i) scraping the surface to remove ice shavings comprising dirt, snow and slush and (ii) flooding the surface with said heated, demineralized flood water; depositing the ice shavings in a holding means and melting the ice shavings thereby producing recovered water; repeating the step of demineralizing, utilizing the recovered water in said flood water.

In accordance with another aspect of the present invention there is provided an ice making and water and energy recovery process for an ice rink, comprising the steps of: demineralizing water to produce flood water substantially free of mineral salts, dissolved solids and other impurities; heating the demineralized water for use as flood water for the ice rink; resurfacing the surface of the ice rink by (i) scraping said surface to remove ice shavings comprising dirt, snow and slush and (ii) flooding the surface with the heated, demineralized flood water; depositing said ice shavings in an holding means and melting the shavings thereby producing recovered water; utilizing the recovered water as a coolant in a refrigeration unit utilized to maintain the temperature of said ice; repeating said step of demineralizing, utilizing said recovered water in said flood water.

An advantage of the present invent ion is that the thickness of the ice required to provide a suitable ice surface for skating is significantly reduced. By utilizing the water recovery process of the present invention, the thickness of the ice can be maintained at about 0.75 inches as compared to the traditional 1.5 inches required for ice rinks maintained under conventional ice maintenance programs. As ice acts as an insulator (thermal conductivity of 15 Btu in/ft$^2$ hr degrees Fahrenheit,), the greater the ice thickness, the lower the refrigerant temperature has to be to produce a given ice surface temperature. In addition to requiring an increased refrigerant load, increased ice thickness creates problems of increased thermal lag and consequently poorer quality ice. The ice produced by the present process is faster, harder, and more resilient to chipping and skate cuts.

An additional advantage of the process of the present invention is that less flood water at a lower temperature is utilized resulting in significant energy savings. In present ice rinks, operators will use flood water in the 130° F.–180° F. range. This is necessary due to the impurities in the flood water and the presence of air. The process of the present invention requires that the flood water need only be heated to 90° F.–130° F. to obtain positive results. Consequently, by using ninety gallons of demineralized water at ninety degrees Fahrenheit, the energy requirements to heat the water would only be 22,500 Btu/flood and the resulting refrigeration load only 112,700 Btu/flood. This represents an energy savings of 75% in water heating and 58% in the flood water refrigeration load.

Another advantage of the present invention is that the ice produced from the process may be maintained at a higher temperature while maintaining a high quality ice surface. Based on a study conducted by the U.S. Department of Energy (DOE/TIC—10289, Energy and Conservation in Ice Skating Rinks, 1980, Bruce Dietrich and Thomas McAvoy), for every 1 degree Fahrenheit the refrigerant and ice temperature can be raised, refrigeration plant energy usage is decreased by about 6%. Utilizing the process of the present invention, the temperature of the ice can be raised about 2 degrees Fahrenheit without effecting the quality of the ice. This effectively results in a potential energy savings of 12% as compared to conventional systems.

In addition to the above, the process of the present invention drastically reduces water consumption since water derived from melted ice shavings is reutilized in the ice maintenance process. It is estimated that 40% to 80% of water used for ice maintenance can be saved using the process of the present invention. This also eliminates the need and problems associated with disposal of the ice shavings.

BRIEF DESCRIPTION OF THE DRAWINGS

The following is a description, by way of example only, of the preferred embodiment of the water recovery process forming the subject invention, reference being had to the accompanying drawings, in which.

DETAILED DESCRIPTION OF THE INVENTION

Figure 1:
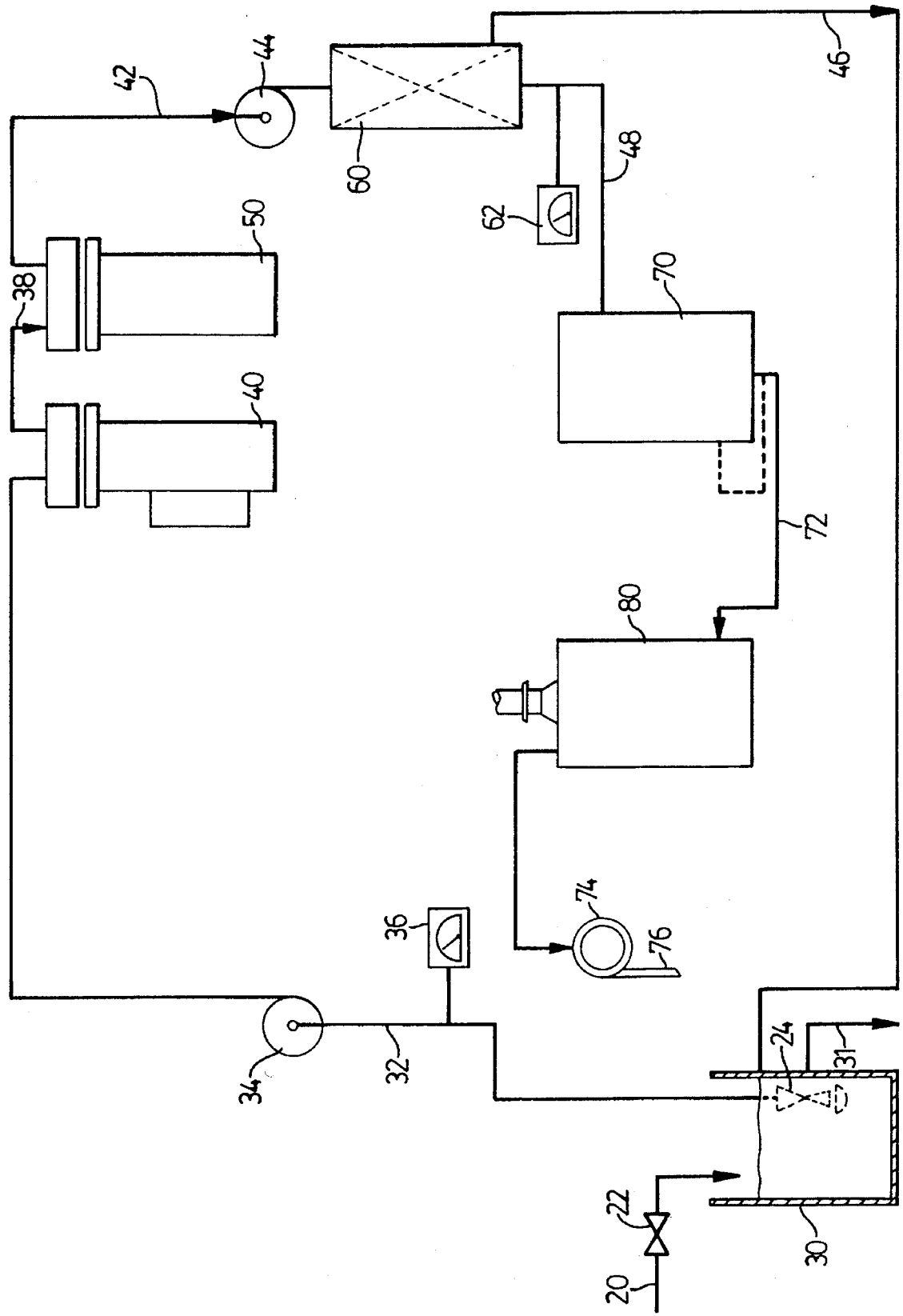
FIG. 1 is a flow sheet diagram of the process.
Figure 3:
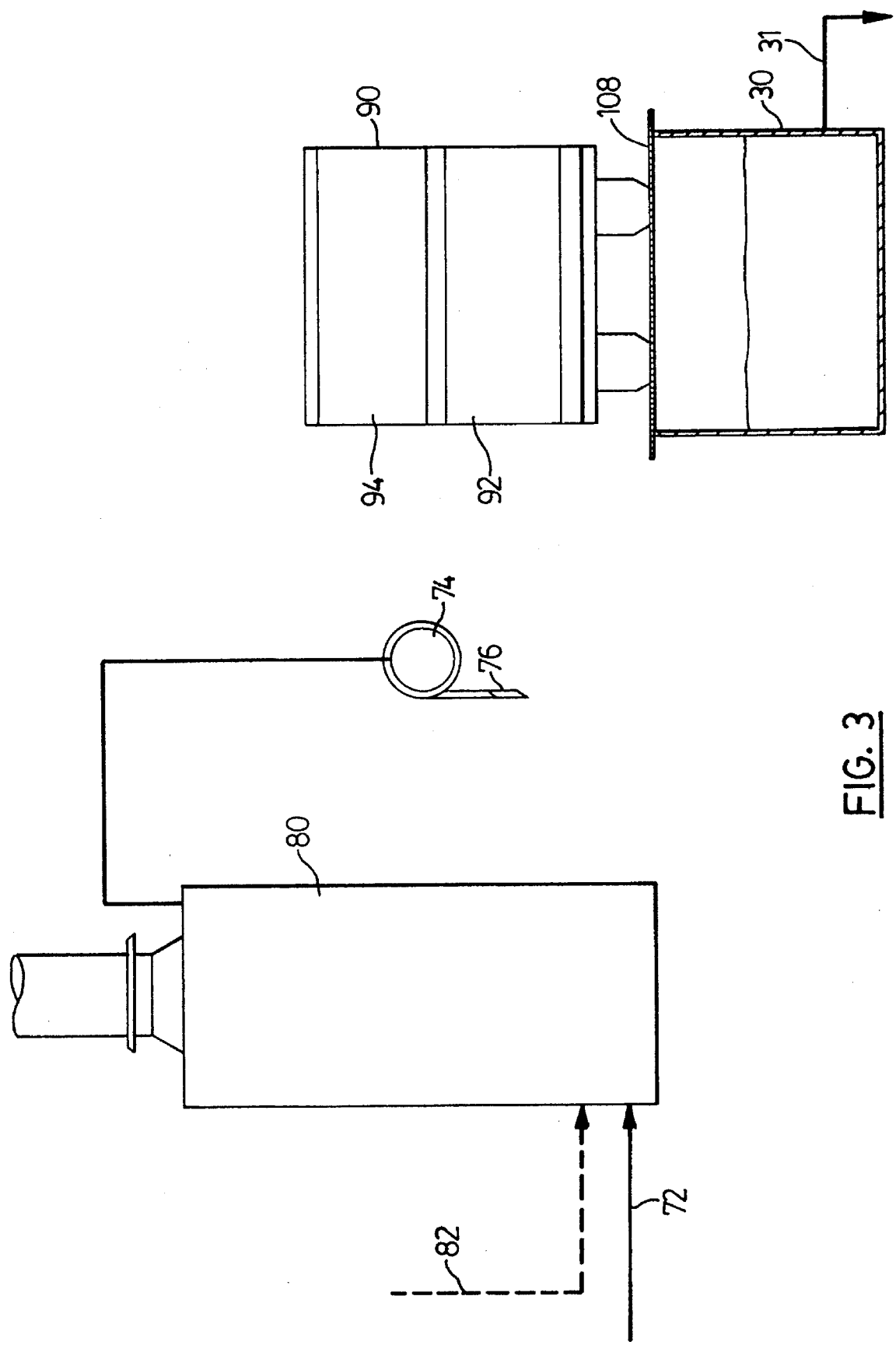
FIG. 3 is a schematic diagram of a resurfacer and its interaction with a water heater.

Referring first to FIG. 1, pipeline 20 feeds municipal water into ice pit 30. A proper water level is maintained in ice pit 30 through the use of float valve 22. In ice pit 30, the municipal water is commingled with reject water from the process and ice shavings deposited from resurfacer 90 (FIG. 3). Pipeline 32 carries water from ice pit 30 to water softener 40. The flow of water in pipeline 32 is controlled by valve 24 and pump 34. Conductivity controller unit 36 monitors the quality of the water in pipeline 32 and adjusts the flow of municipal water in pipeline 20 to vary the concentration of impurities in the water as required. Alternatively, conductivity controller unit 36 advises the operator by a monitor or alarm (not shown) that the concentration of the impurities have exceeded a specified level.

Pipeline 38 carries the water from water softener 40 to carbon filter 50. Pump 44 transports the treated water through pipeline 42 from filter 50 to demineralization unit 60. Reject water from demineralization unit 60 is transported by pipeline 46 back to ice pit 30. Demineralized water is removed from the demineralization unit 60 and transported via pipeline 48 to flood water storage tank 70. Conductivity controller unit 62 monitors the quality of the demineralized water and increases or decreases the flow of reject water in pipeline 46 accordingly. More particularly, where the quantity of the demineralized water is poor, most of the demineralized water is rejected and recirculated in the system for further demineralization.

Demineralized water is drawn from flood water storage tank 70 via pipeline 72 into heater 80. Heater 80, utilizing gas from gas line 82 (FIG. 3), heats the flood water to about ninety to about one hundred and thirty degrees Fahrenheit (the optimum temperature for the flood water). Hose 74 carries the heated flood water through gas pump nozzle 76 into a water tank of a resurfacer shown in FIG. 3. Turning to FIG. 3, ice shavings are scraped from the surface of the ice and stored in ice tank 94 of the resurfacer. Flood water stored in water tank 92 of resurfacer 90 is then used to apply a new layer of ice to the freshly scraped surface of the ice. The ice shavings stored in snow tank 94 of the resurfacer 90 are then deposited into ice pit 30. Returning to FIG. 1, pipeline 31 drains excess water from the process thereby allowing fresh make-up water from pipeline 20 to be introduced into the process as required.

In operation, municipal water is fed into ice pit 30 via pipeline 20. In ice pit 30, the municipal water is mixed with reject water from demineralization unit 60 and ice shavings deposited from resurfacer 90. A suitable level of liquid is maintained in ice pit 30 through the use of float valve 22. As the level of liquid in ice pit 30 begins to drop, float valve 22 opens to allow additional municipal water to flow into the ice pit. The water mixture is transported in pipeline 32 via pump 34 to water softener 40. Conductivity meter 36 monitors the specific conductance of the water mixture in pipeline 32 and adjusts the flow of municipal water into the process.

In water softener 40, the water mixture is treated prior to entry in demineralization unit 60 whereby the treated water is demineralized by reverse osmosis. The water mixture is then fed via pipeline 38 to carbon filter unit 50 where the water mixture is further treated prior to entry in demineralization unit 60. Pump 44 pumps the treated water via pipeline 44 to demineralization unit 60. In demineralization unit 60, minerals and other impurities are removed from the treated water through reverse osmosis. Reject water from demineralization unit 60 is transported back to ice pit 30 via pipeline 46 for further use in the process.

Demineralized water is removed from demineralization unit 60 and transported to flood water storage tank 70 via pipeline 48. Conductivity meter 62 monitors the specific conductance of the demineralized water and adjusts the flow of reject water in pipeline 46 accordingly.

The demineralized water is stored in flood water storage tank 70 and transported, as required, via pipeline 72 to hot water heater 80. The heated demineralized water in water heater 80 is used to fill water tank 92 of resurfacer 90. Resurfacer 90 then resurfaces the ice's surface by first scraping and then flooding the surface with the heated demineralized water. The ice scrapings from the ice's surface are deposited into snow tank 94 of resurfacer 90. Resurfacer 90 then transports the ice shavings and deposits them into ice pit 30. Water is removed from the process via pipeline 31 so that fresh municipal water can be continuously added to the process.

It is preferable that a gas pump nozzle 76 be used to control the amount of flood water supplied to the resurfacer 90 from heater 80. The use of a gas pump nozzle not only prevents the occurrence of over flowing from supplying too much water to the resurfacer but also allows an operator to control the amount of flood water being supplied to the resurfacer so that the exact quantity required is provided.

This ensures that heated flood water is not needlessly wasted.

Figure 2:
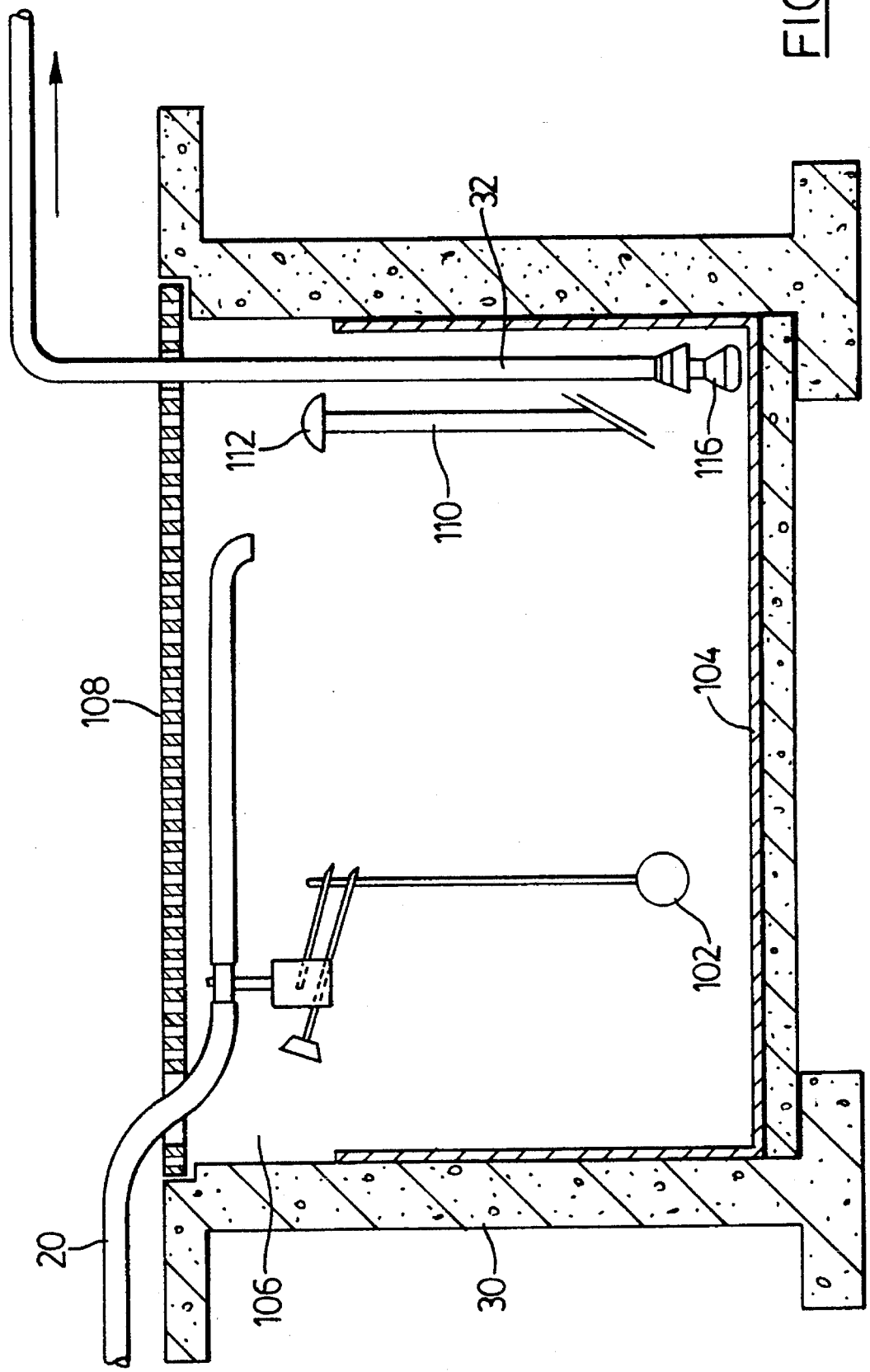
FIG. 2 is a schematic representation of an ice pit and the plumbing layout associated therewith.

Referring now to FIG. 2, the preferred embodiment of ice pit 30 is shown. Pipeline 20 feeds municipal water into ice pit 30. Liquid level valve 102 controls the flow of the municipal water into ice pit 30 and ensures that a minimum level of water is maintained in the ice pit. Ice pit 30 is constructed of concrete and consequently a membrane 104 is required to coat the inner surface 106 of the ice pit 30. This membrane prevents the relatively pure water stored in ice pit 30 from decalcifying the concrete walls of the pit through absorption, by the water stored in the pit, of minerals contained within the concrete.

Steel grate 108 is placed over the top opening of ice pit 30 to prevent impurities from falling into the pit as well as for safety purposes. Drain pipe 110 elevates drain 112 so that water removed from ice pit 30 and, as a consequence, from the process, is from the upper portion of the water mixture stored in ice pit 30 where impurities in the form of oils are more highly concentrated.

Pipeline 32 having ball check valve 116, transports the combined water mixture from ice pit 30 to the water softening and carbon filter unit where the water is treated prior to entry in the demineralization unit. Ball check valve 116 controls the flow of water out of ice pit 30 and prevents some contaminants from leaving the ice pit 30 and continuing on in the process.

Although, as discussed above, the water can be demineralized in the demineralization unit 60 by reverse osmosis technology (such as through the use of the Pro Ice" system from Bassai Limited) other demineralization processes such as aleionization or distillation may be used.

The properties of the demineralized flood water can be further enhanced by adding an oxygen elimination device to the process. This device could be an ion exchange column; absorption screening process, a surface active agent that is effective at lowering the surface tension of the water, or an oxygen resin scavenger. As air is also a good insulator, any trapped air in the ice will increase the refrigeration plant energy usage. The elimination of air will not only reduce energy requirements, but it will improve the appearance of the ice (ie. improved gloss and clarity) and increase the density of the ice resulting in reduced cuts in the ice's surface. The oxygen resin scavenger is the preferred device for the present invention.

Figure 4:
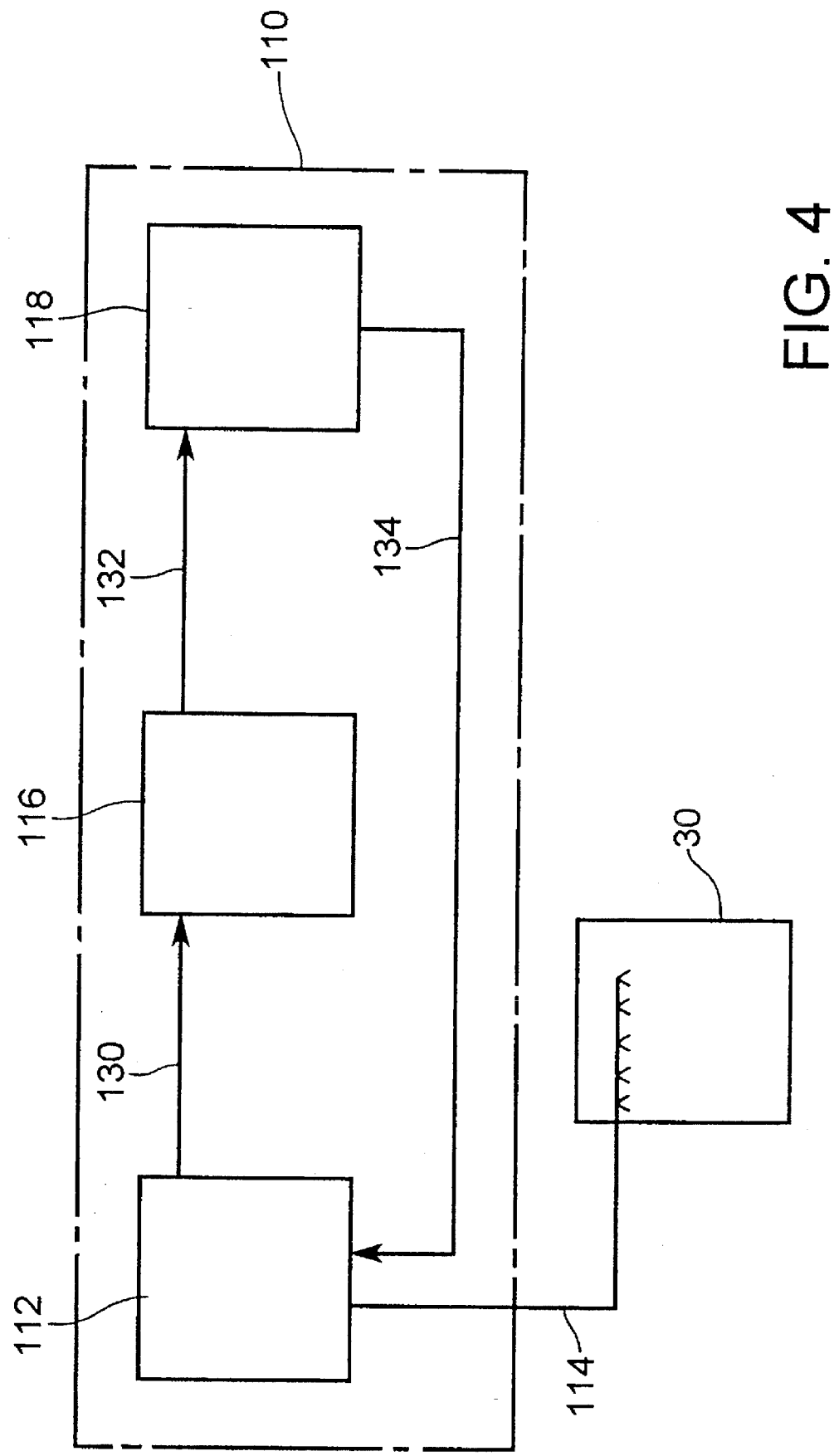
FIG. 4 is a flow sheet diagram showing the utilization of recovered heat from the refrigeration plant in the melting of ice shavings in an ice pit.

Refering now to FIG. 4, the melting time of the ice shavings in ice pit 30 can be decreased by recovery and utilization of heat produced in the ice rink's refrigeration plant 110.

Refrigeration plant 110 includes compressors 112, evaporator condenser 116 and chiller 118. Liquid refrigerant is piped from evaporator condenser 116 to chiller 118 via pipeline 132. The refrigerant is then fed via pipeline 134 to compressors 112. Hot discharge gas from compressors 112 is piped to the evaporator condenser 116 via pipeline 130 and the cycle is then repeated.

Hot water recovered from compressors 112 of refrigeration plant 110 may be piped to ice pit 30 via pipeline 114 and dispersed over the contents of the pit through the use of a spray nozzle. Alternatively, hot discharge gas (temp. approx 240 degrees Fahrenheit) from compressors 112 can be piped through the ice pit to assist in the melting of the ice shavings.

In addition to utilizing recovered heat from an ice rink's refrigeration system to assist in the melting rate of the ice shavings, the process may be adapted to utilize the cool or chilled water held in ice pit 30 as an additional coolant in the ice rink's refrigerant system.

Figure 5:
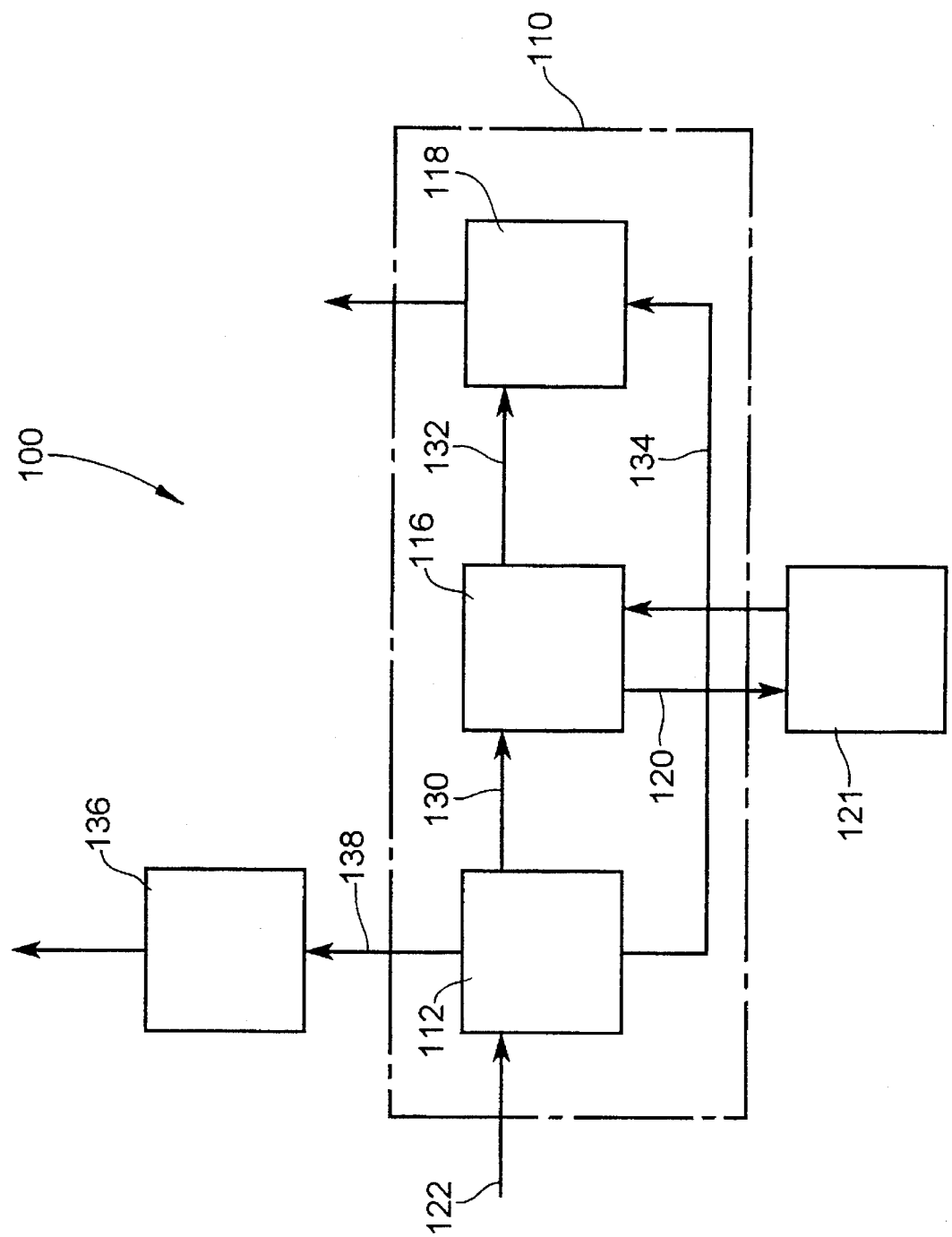
FIG. 5 is a flow sheet diagram of the heat recovery system.

Referring to FIG. 5, the contents of ice pit 30 may be circulated via pipeline 120 through evaporator condenser 116 providing necessary cooling water for the condenser.

Use of cool water originating from ice pit 30 as described above, helps to reduce the head pressure of the compressors and reduce the run time on condenser fans. In addition, since the water from the ice pit has a low conductivity or TDS, scale formation can be minimized and the cycles of concentration for the condensers can be increased.

The process may be further improved by utilizing recovered heat from the refrigeration plant to heat the demineralized flood water. The current practice used in the maintenance of most ice rinks is to pipe the reject water from the refrigeration system to a water tank. Some water is recirculated from the water tank (ie. 1.2 cycles of concentration might be typical for an ice rink) through the refrigeration system, but most of the water in the tank goes to drain.

It has been found that the temperature of the demineralized flood water required to obtain good quality ice is about ninety to one hundred and thirty degrees Fahrenheit. Coincidently, the temperature of reject water from compressors in the ice rink's refrigeration system is also about ninety degrees Fahrenheit.

Referring to FIG. 5 again, cold municipal water is fed through compressors 112 via feedline 122. The water, now having been warmed to approximately 90° F., is fed. to storage tank 136 via pipeline 138. From storage tank 136, the water is fed to water softener 40 and filter 50 (FIG. 1) for pretreatment prior to entering the demineralization unit 60 (FIG. 1).

While the process forming the present invention has been described and illustrated with specific reference to the various embodiments, it will be appreciated that numerous variations of these embodiments may be made without departing from the scope of the invention described herein.

I claim:

1. An ice making and water recovery process for an ice rink having an ice surface comprising the steps of:

demineralizing water to remove substantially all impurities including mineral salts and dissolved solids from said water thereby producing demineralized water;

heating said demineralized water for use a flood water for an ice rink;

resurfacing the surface of said ice rink by (i) scraping said surface to remove ice shavings comprising dirt, snow and slush (ii) flooding said surface with said heated demineralized water;

depositing said ice shavings in a holding means and melting said shavings thereby producing recovered water;

cooling a refrigerant of a refrigeration unit with said recovered water, said refrigeration unit for maintaining the temperature of said ice surface;

repeating said steps of demineralizing, heating, and resurfacing utilizing said recovered water.

2. The process of claim 1 wherein said step of melting said ice shavings comprises utilizing recovered heat from a refrigeration unit for said ice rink.

3. The process of claim 2 including the steps of softening and carbon filtering said water prior to the step of demineralizing.

4. The process of claim 1 wherein the step of demineralizing comprises substantially demineralizing the water so that the resulting demineralized water has a specific conductance of about 2 to 30 micromhos/cm.

5. The process of claim 1 wherein the step of demineralizing comprises reverse osmosis.

6. The process of claim 1 wherein the step of demineralizing comprises demineralization by deionization.

7. The process of claim 1 wherein the step of demineralizing comprises distilling.

8. The process of claim 1 wherein the step of heating comprises heating said demineralized water to about 90 to 130 degrees Fahrenheit.

9. The process of claim 8 wherein recovered heat from a refrigeration plant is utilized in the step of heating said demineralized water.

10. The process of claim 1 including the step of substantially eliminating air from said demineralized water.

11. The process of claim 10 wherein the step of substantially eliminating air from said demineralized water is by absorption screening.

12. The process of claim 10 wherein the step of substantially eliminating air from said demineralized water comprises passing said demineralized water through an oxygen scavenger resin.

13. The process of claim 10 wherein the step of substantially eliminating air from said demineralized water comprises adding a surface active agent to said demineralized water whereby the surface tension of said demineralized water is reduced.

14. The process of claim 1 wherein the step of demineralizing water comprises recirculating a quantity of reject water from said demineralizing step to an ice pit for reutilization in said ice making and water recovery process.

* * * * *